US011915844B2

(12) United States Patent
Walton et al.

(10) Patent No.: US 11,915,844 B2
(45) Date of Patent: Feb. 27, 2024

(54) PROCESSING OF NdFeB MAGNETIC MATERIAL

(71) Applicant: The University of Birmingham, Birmingham (GB)

(72) Inventors: Allan Walton, Birmingham (GB); Neil Rowson, Birmingham (GB)

(73) Assignee: The University of Birmingham, Birmingham (GB)

( * ) Notice: Subject to any disclaimer, the term of this patent is extended or adjusted under 35 U.S.C. 154(b) by 0 days.

(21) Appl. No.: 16/327,747

(22) PCT Filed: Aug. 25, 2017

(86) PCT No.: PCT/GB2017/052505
§ 371 (c)(1),
(2) Date: Feb. 22, 2019

(87) PCT Pub. No.: WO2018/037241
PCT Pub. Date: Mar. 1, 2018

(65) Prior Publication Data
US 2019/0244733 A1    Aug. 8, 2019

(30) Foreign Application Priority Data
Aug. 25, 2016  (GB) .................................... 1614484

(51) Int. Cl.
*H01F 1/057*     (2006.01)
*C22B 7/00*      (2006.01)
(Continued)

(52) U.S. Cl.
CPC .............. *H01F 1/0573* (2013.01); *B22F 8/00* (2013.01); *B22F 9/023* (2013.01); *C22B 7/005* (2013.01);
(Continued)

(58) Field of Classification Search
None
See application file for complete search history.

(56) References Cited

U.S. PATENT DOCUMENTS 8,734,714 B2    5/2014   Harris et al.
9,663,843 B2    5/2017   Harris et al.
(Continued)

FOREIGN PATENT DOCUMENTS

CN         104174857        12/2014
CN         104174857 A   *  12/2014
(Continued)

OTHER PUBLICATIONS

ASTM, "Standard Test Methods for Density of Compacted or Sintered Powder Metallurgy (PM) Products Using Archimedes' Principle", American Society for Testing and Materials B962, 2008, United States, 6 pages.
(Continued)

*Primary Examiner* — Sally A Merkling
*Assistant Examiner* — Dean Mazzola
(74) *Attorney, Agent, or Firm* — Wells St. John P.S.

(57) ABSTRACT

A method of processing NdFeB magnetic powder comprises: providing a source of hydrogenated NdFeB powder (101, 102, 103); feeding said powder into an inlet of a cyclone separator (104); separating the powder into an overflow enriched in Nd-rich grain boundary phase and an underflow enriched in $Nd_xFe_yBH_z$ matrix phase particles (106); optionally feeding the underflow back into the inlet of the cyclone separator whereby to further enrich the underflow in the $Nd_xFe_yBH_z$ matrix phase particles (108a); and collecting the underflow (108).

18 Claims, 1 Drawing Sheet

(51) Int. Cl.
*H01F 41/02* (2006.01)
*B22F 8/00* (2006.01)
*B22F 9/02* (2006.01)

(52) U.S. Cl.
CPC ....... *H01F 1/0571* (2013.01); *H01F 41/0253* (2013.01); *Y02P 10/20* (2015.11)

(56) References Cited

U.S. PATENT DOCUMENTS

| 2002/0020469 | A1* | 2/2002 | Okayama | H01F 1/0573 148/29 |
| 2012/0137829 | A1* | 6/2012 | Harris | C22B 7/002 75/363 |
| 2013/0263699 | A1 | 10/2013 | Harris et al. | |
| 2014/0334962 | A1 | 11/2014 | Sun | |
| 2015/0243417 | A1 | 8/2015 | Sun | |
| 2015/0243433 | A1 | 8/2015 | Sun | |

FOREIGN PATENT DOCUMENTS

| CN | 104439258 | | 3/2015 |
| CN | 104439258 A | * | 3/2015 |
| EP | 11813796.7 | | 12/2011 |
| EP | 2722856 | | 7/2020 |
| EP | 17758929.8 | | 7/2020 |
| GB | 1614484.2 | | 1/2017 |
| WO | WO PCT/GB2017/052505 | | 11/2017 |
| WO | WO PCT/GB2017/052505 | | 3/2019 |

OTHER PUBLICATIONS

Faria et al., "High Coercivity Sintered Pr—Fe—B—Cu Magnets using the Hydrogen Decrepitation Process", Journal of Alloys and Compounds vol. 177, 1999, Netherlands, pp. 311-320.

Herraiz et al., "Recycling of Nd—Fe—B Magnets by Hydrocyclone Separation and Re-Sintering", available online at http://www.kuleuven.rare3.eu/wp-content/plugins/rare/images/papers/Full_paper_4646_Hydrocyclone_Separantion_And_Re-sintering.pdf, Apr. 11, 2017, 6 pages.

Mottram et al., "The Use of Metal Hydrides in Powder Blending for the Production of NdFeB-Type Magnets", Journal of Alloys and Compounds vol. 283, Feb. 1999, Netherlands, pp. 282-288.

Zakotnik et al., "Commercial-Scale Recycling of NdFeB-type Magnets with Grain Boundary Modification Yields Products with 'Designer Properties' that Exceed Those of Starting Materials", Waste Management vol. 44, Oct. 1, 2015, United Kingdom, pp. 48-54.

* cited by examiner

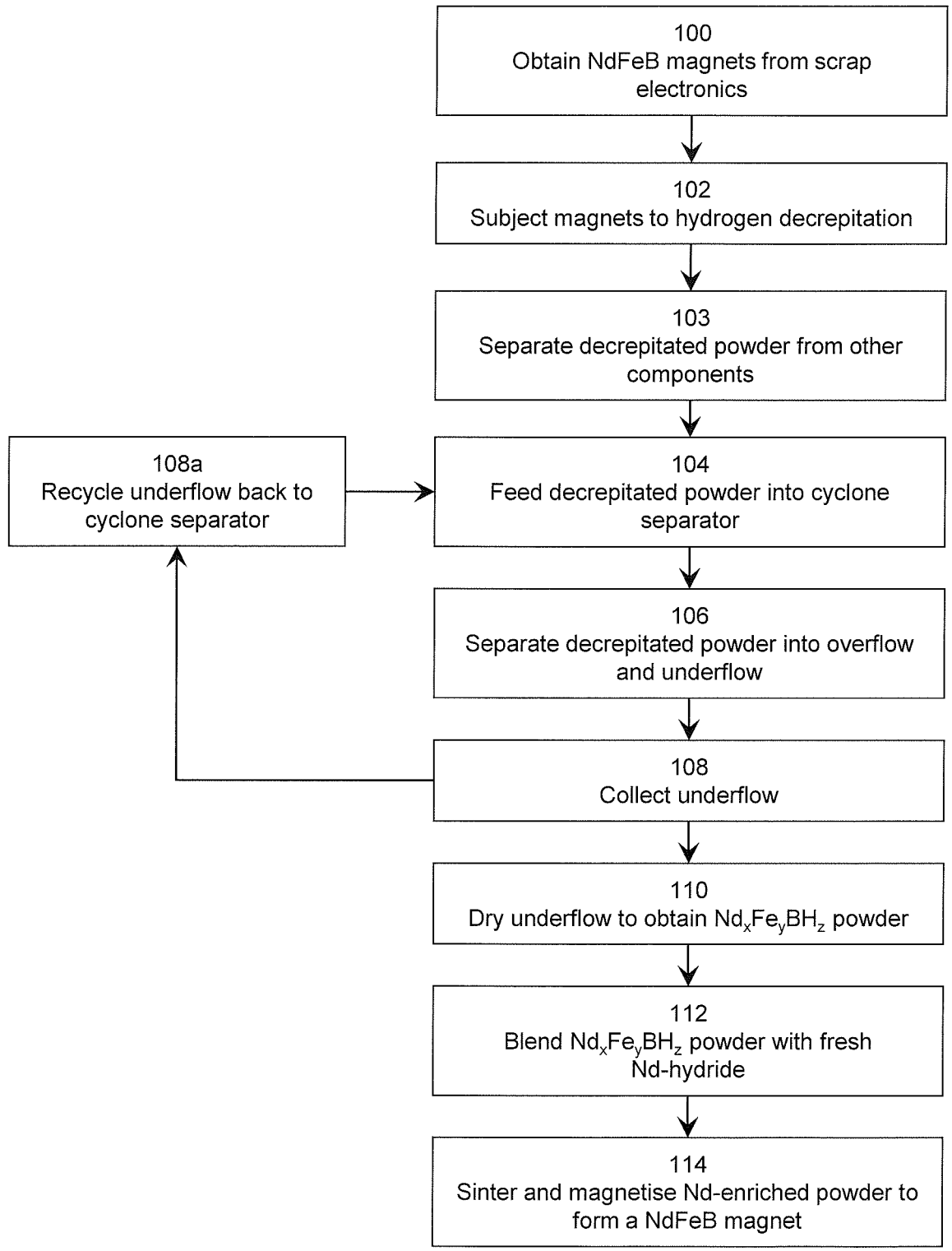

PROCESSING OF NdFeB MAGNETIC MATERIAL

RELATED PATENT DATA

This application is a 35 U.S.C. § 371 of and claims priority to PCT International Application Number PCT/GB2017/052505, which was filed 25 Aug. 2017, and was published in English, which claims priority to GB Patent Application No. 1614484.2, which was filed 25 Aug. 2016, the teachings of which are incorporated herein by reference.

TECHNICAL FIELD

This invention relates to an improved method for processing and/or recycling rare earth metal magnets, specifically NdFeB magnets.

BACKGROUND

Rare earth magnets based on neodymium iron boron (NdFeB) alloys are employed in many clean energy and high tech applications, including hard disk drives (HDDs), motors in electric vehicles and electric generators in wind turbines. While demand for rare earth element-based materials continues to grow, such materials are at a critical supply risk. One option for alleviating this supply risk involves recycling end-of-life products containing rare earth elements.

HDDs have been identified as one of the most abundant and readily available forms of waste electronics scrap containing sintered fully dense NdFeB magnets. However, separation of the magnet can be difficult because the magnets are nickel-coated, fully magnetised and glued into their functional position.

Hydrogen decrepitation may be used to process sintered NdFeB magnets into demagnetised, hydrogenated NdFeB powder. During this process, the nickel coating (if present) peels away from the surface of the magnet and the hydrogenated powder may be liberated from the electronics scrap by sieving. The hydrogenated powder can then be re-sintered and magnetised to produce recycled NdFeB magnets.

However, re-sintered magnets formed from decrepitated powder exhibit reduced density and coercivity compared to the starting material, due to higher oxygen content of the starting sintered magnets compared to primary sources. There is therefore a need for improving the processing of scrap NdFeB magnets.

SUMMARY OF INVENTION

According to the present invention there is provided a method of processing NdFeB magnetic powder comprising:
(i) providing a source of hydrogenated NdFeB powder;
(ii) feeding said powder into an inlet of a cyclone separator;
(iii) separating the powder into an overflow enriched in Nd-rich grain boundary phase particles and an underflow enriched in $Nd_xFe_yBH_z$ matrix phase particles;
(iv) optionally feeding the underflow back into the inlet of the cyclone separator whereby to further enrich the underflow in the $Nd_xFe_yBH_z$ matrix phase particles; and
(v) collecting the underflow.

The invention finds particular utility in the recycling of scrap sintered magnets from, for example, hard disk drives, loudspeakers and automotive motors.

Hydrogenated NdFeB powder may be obtained from NdFeB magnets by processes such as Hydrogen Processing of Magnet Scrap (HPMS) involving decrepitation, as described for example in European Patent application EP 11813796.7.

Uncoated, sintered NdFeB magnets comprise a matrix of $Nd_2Fe_{14}B$ grains surrounding a Nd-rich grain boundary. During hydrogenation, the Nd-rich grain boundary phase forms $NdH_{2.7}$, then the matrix phase forms $Nd_2Fe_{14}BH_x$. The differential expansion of these two phases due to hydride formation causes inter-granular cracking at the grain boundaries, creating larger $Nd_2Fe_{14}BH_x$ matrix phase particles and smaller $NdH_{2.7}$ grain boundary phase particles. The matrix phase particles are typically greater than 5 microns in size, while the $NdH_{2.7}$ particles are typically smaller than 1 micron (with concomitant differences in masses).

NdFeB magnets can contain a significant amount of oxygen. It has been found that this oxygen is mainly entrained in the Nd-rich grain boundary phase, and can prevent some of the grain boundary phase reacting with hydrogen during the decrepitation process. These oxygen-rich portions of the grain boundary phase also break apart into particles smaller than 1 micron.

When the powder is reformed into new magnets by re-sintering, the presence of these oxygen-rich particles can be detrimental to the sintering behaviour of the material, resulting in a loss of coercivity in the magnet. During sintering the Nd-rich phase would normally form a liquid, which allows for liquid phase sintering. If the Nd-rich phase has already been oxidised then it will no longer melt during re-sintering and therefore the re-sintered magnet has a lower density. This can be overcome by powder blending with extra Nd, $NdH_2$ or a rare earth alloy. However the extra oxygen will still be entrained in the magnet and by adding extra rare earth material the magnetic strength (remanence) is reduced. Therefore if the oxygen-rich particles can be removed prior to re-sintering then the magnetic properties of the final magnet should be improved.

Particles of different sizes may conventionally be separated by sieving. However, particles smaller than 40 microns tend to aggregate and stick together due to electrostatic attraction. The <1 micron grain boundary phase particles present in the hydrogenated powder therefore cannot be separated from the larger matrix phase particles by conventional sieving.

The cyclone separator classifies particles based on mass. It will be understood that the "cut-off" (i.e. the nominal mass larger than which particles are directed to the underflow) is set according to the expected masses of the particles to be separated.

Depending on particle size distributions and the sensitivity of the cyclone separator, satisfactory separation of the Nd-rich grain boundary phase and $Nd_xFe_yBH_z$ matrix phase particles may not be possible in a single pass. Thus, the underflow may be fed into the inlet of the cyclone separator multiple times, e.g. two, three or four times. In some embodiments the underflow is fed into the inlet of the cyclone separator until the underflow is at least 85 wt %, 90 wt %, 95 wt % or 97 wt % $Nd_xFe_yBH_z$ matrix phase particles.

The Nd-grain boundary phase is required, inter alia, for proper densification of the sintered magnet. Having removed Nd from the NdFeB powder it must be replaced. Thus the method further comprises an additional step of blending the underflow collected in step (v) with fresh Nd-hydride particles to produce a Nd-enriched powder and sintering and magnetising the Nd-enriched powder to form a NdFeB magnet.

In some embodiments the cyclone separator is a hydrocyclone separator and the hydrogenated NdFeB powder is formed into an aqueous slurry before being fed into the inlet of the separator. The cyclone media could also be another fluid or an inert gas.

BRIEF DESCRIPTION OF THE DRAWINGS

FIG. 1 is a flow diagram of a method for recycling NdFeB magnets according to an embodiment of the present invention.

DETAILED DESCRIPTION

Referring to FIG. 1, the NdFeB magnet starting material is obtained by breaking apart waste electronics and electrical equipment 100. The starting material is subjected to hydrogen decrepitation 102 to form a powder comprising larger $Nd_xFe_yBH_z$ matrix phase particles and smaller Nd-rich grain boundary phase particles. The powder is separated from the other components by sieving 103.

The decrepitated powder is fed into a cyclone separator 104, wherein the powder is separated 106 into an overflow comprising mostly Nd-rich grain boundary phase particles and an underflow comprising mostly $Nd_xFe_yBH_z$ matrix phase particles.

The underflow is collected 108, and may be optionally fed back into the cyclone separator 108a in order to improve the separation yield. After one or more cycles through the cyclone, the underflow is dried 110 to obtain a powder consisting almost entirely of $Nd_xFe_yBH_z$ matrix phase particles. The $Nd_xFe_yBH_z$ powder is blended with fresh neodymium hydride 112, and sintered and magnetised 114 to form a recycled NdFeB magnet.

The starting material was in the form of Ni coated arc segments obtained from scrap VCM magnets from the former Philips factory, in Southport UK. The composition, minor additions excluded, was $Nd_{11.61}Dy_{0.53}Pr_{1.59}Fe_{77.89}Al_{0.75}Co_{1.44}Cu_{0.09}B_{6.01}$ and was determined by inductively coupled plasma optical emission spectrometry (ICP-OES). The Ni coating layer was removed from the surface of the VCMs by scoring and peeling. The magnets were then HD processed at 4 bar for 1 h. The powder remained non-milled.

In a specific embodiment of the present invention, $NdH_{2.7}$ particles are separated from matrix phase particles by use of a hydrocyclone separator. 1 kg of non-milled powder was mixed with water to form a slurry, at a 10 wt % ratio, and pumped tangentially into a cone-shaped separator, which creates a vortex flow as the water travels helically downward. Larger particles are forced radially outward to the wall of the vessel by centrifugal force and descend to the bottom of the vessel due to friction and gravity. Smaller particles tend to spiral upwards and exit at the top of the vessel. This produced a small particle sized overflow stream (OF) and a large particle size underflow stream (UF). A total of three hydrocyclone separation experiments were performed on each input feed. After the first hydrocyclone separation the UF was the input for the next hydrocyclone separation stage. After separation, both fractions were filtered and then dried at 80° C. in air. All produced fractions were assessed by x-ray fluorescence (XRF), performed in a Philips XRF PW2400; by ICP-OES, analysed in an ICP-OES Varian 720ES; and by x-ray diffraction (XRD), performed in a PANalytical Empyrean. The error associated with XRF, ICP-OES and XRD was, respectively, ±0.10 wt %, ±0.01 wt % and ±0.50 wt %.

The OF stream which exits at the top of the vessel comprises mainly grain boundary phase particles ($NdH_{2.7}$ and Nd-oxides/hydroxides), while the UF stream which exits at the bottom of the vessel comprises mainly matrix phase particles ($Nd_2Fe_{14}BH_x$).

Fresh $NdH_{2.7}$ was produced by roller ball milling for 20 h and sieving through a 45 μm sieve. The $Nd_{2.7}$ was blended with the HD VCM hydrocyclone separated powder at 5 at % by passing them together through a 45 μm sieve.

All sintered magnets produced during this work were made via the HD powder metallurgy route, at optimum conditions [R. S. Mottram, A. Kianvash, I. R. Harris, The use of metal hydrides in power blending for the production of NdFeB-type magnets, J. Alloy. Compd. 283 (1999) 282-288 and R. N. Faria, J. S. Abell, I. R. Harris, High coercivity sintered Pr—Fe—B—Cu magnets using the hydrogen decrepitation process, J. Alloy. Compd. 177 (1991) 311-321]. 15 g of powder of the specified sample was aligned at 9 T in a capacitor discharge pulse magnetiser prior to isostatic pressing at 60 MPa. The green compact was then sintered at 1060° C. for 1 h in vacuum. After sintering the samples were pulse magnetised at 9 T prior to measurement of the magnetic properties in a Permagraph von Dr Steingroever. Density measurements were performed using a standard Archimedes displacement method and calculated according to international standards [American Society for Testing and Materials B 962, Standard Test Methods for Density of Compacted or Sintered Powder Metallurgy (PM) Products Using Archimedes' Principle (2008)]. A JEOL 6060 scanning electron microscope (SEM) was used for back-scattered electron (BSE) micrographs of sintered Nd—Fe—B magnets. The errors associated with density ($\rho$) and relative density ($\rho_{rel}$) was ±0.05 g cm$^{-3}$ and ±0.1%. The errors of the coercivity ($H_c$), remanence ($B_r$) and maximum energy product ($(BH)_{max}$) were calculated to be ±5 kA m$^{-1}$, ±5 mT and ±5 kJ m$^{-3}$ respectively.

In another embodiment (not shown), an inert gas cyclone may be used instead of a hydrocyclone.

Results

BSE SEM images of UF and OF powder after cyclic hydrocyclone separation were obtained using non-milled hydrogen decrepitated (HD) VCM powder as input feed (not shown). It was immediately evident that in all cases there is a greater fraction of smaller particles <2 μm in the OF stream. Using EDX analysis this was shown to be Nd-rich and is thought to be the grain boundary phase (GBP). However, some larger particles can still be observed in the OF which were shown by EDX analysis to relate to the $Nd_2Fe_{14}B$ hydride matrix phase.

The UF fraction contains particles in the range of 10-20 μm, which relate to the $Nd_2Fe_{14}B$ hydride matrix phase but with smaller particles on the surface. This is thought to be due to triboelectric charges that still exist between the GBP and the larger $Nd_2Fe_{14}B$ hydride particles. It is interesting to note that the particle size is about the same size as the original grains of $Nd_2Fe_{14}B$ in the sintered magnet. Therefore the hydrocyclone appears to be breaking apart the hydrogen processed powder into near single crystal particles.

As the aim was to purify the $Nd_2Fe_{14}B$ matrix phase particles, then only the results of the UF fraction are shown here. XRF, ICP-OES and XRD analysis are presented, respectively, in Tables 1, 2 and 3.

TABLE 1

XRF results expressed in wt % from the UF after three cycles of hydrocyclone separation. Numbers refer to the cycle of hydrocyclone.

| Sample | | Fe | Nd | Dy | ΣREE |
|---|---|---|---|---|---|
| Starting material | | 61.5 | 34.9 | 1.4 | 36.7 |
| Non-milled HD | Air | 61.0 | 35.2 | 1.4 | 37.1 |
| | UF-1 | 61.6 | 34.7 | 1.4 | 36.6 |
| | UF-2 | 65.6 | 30.8 | 1.4 | 32.6 |
| | UF-3 | 66.5 | 30.0 | 1.4 | 31.7 |

TABLE 2

ICP-OES results expressed in wt % from the UF after three cycles of hydrocyclone separation.

| Sample | | Fe | Nd | Dy | ΣREE |
|---|---|---|---|---|---|
| Starting material | | 61.92 | 34.21 | 0.95 | 35.45 |
| Non-milled HD | Air | 61.37 | 35.31 | 1.01 | 36.59 |
| | UF-1 | 63.27 | 33.59 | 0.97 | 34.85 |
| | UF-2 | 68.71 | 28.25 | 2.09 | 30.82 |
| | UF-3 | 68.89 | 28.06 | 2.09 | 30.63 |

TABLE 3

XRD quantification results expressed in wt % from the UF after three cycles of hydrocyclone separation.

| Sample | | $Nd_2Fe_{14}B$ | $Nd_2O_3$ | $Nd_2Fe_{14}BH_x$ | $Nd(OH)_3$ |
|---|---|---|---|---|---|
| Starting material | | 99.3 | 0.7 | n/d | n/d |
| Non-milled HD | Air | 0.5 | 1.2 | 88.9 | 9.1 |
| | UF-1 | n/d | n/d | 91.3 | 8.4 |
| | UF-2 | n/d | n/d | 96.2 | 3.8 |
| | UF-3 | n/d | n/d | 97.1 | 2.8 | n/d—Not detected

The main aim of subjecting the HD powder to hydrocyclone separation was to extract all the GBP in order to have a clean fraction based on the $Nd_2Fe_{14}B$ hydride matrix phase alone. It is clear from the ICP-OES and XRF results that, although there are some subtle differences in the Nd ratios between the different analytical techniques, there is a clear trend showing that the Nd ratio is falling in the UF with increasing number of cycles on the hydrocyclone. This is clear evidence that the hydrocyclone is capable of stripping out the small Nd-rich GBP particles.

The stoichiometric $Nd_2Fe_{14}B$ composition should have an Fe/ZREE ratio of around 2.71 by wt %. The Fe/ZREE ratio, using ICP-OES data in Table 2, increased from 1.68 in the input HD material to 1.81, 2.23 and 2.25 after the $1^{st}$, $2^{nd}$ and $3^{rd}$ cycle of hydrocyclone separation.

It is interesting to note from the XRD results in Table 3 that the $Nd_2Fe_{14}B_x$ matrix particles are still intact, even after exposure to water in the cyclone and after heating in air at 80° C. This powder was also exposed to air for over 4 months prior to measurement on the XRD. No evidence of α-Fe could be observed in the XRD traces which would be a sign of the matrix grains breaking down. The XRD results showed that the Nd-rich phase had transformed into $Nd(OH)_3$ on exposure to water in the hydrocyclone.

The XRD data showed an increase in $Nd_2Fe_{14}B$ matrix hydride and a subsequent decrease in neodymium hydroxide, with increasing number of cycles of hydrocyclone separation, yielding a maximum of 68.89 wt % after the $3^{rd}$ cycle, close to the 72.3 wt % present in the stoichiometric $Nd_2Fe_{14}B$. It can therefore be stated that both phases have shown significant separation during hydrocyclone processing.

The hydrocyclone separated HD powder (3 cycles) and a powder blend containing the same powder with an additional 5 at % $NdH_{2.7}$ was re-sintered into new Nd—Fe—B magnets. The magnetic properties of the resultant magnets are shown in Table 4.

TABLE 4

Properties of starting material and recycle sintered Nd—Fe—B-based magnets blended with neodymium hydride.

| $NdH_{2.7}$ [at %] | $\rho$ [g cm$^{-3}$] | $\rho_{rel}$ [%] | $H_c$ [kA m$^{-1}$] | $B_r$ [mT] | $(BH)_{max}$ [kJ m$^{-3}$] |
|---|---|---|---|---|---|
| Starting material | 7.59 | 99.98 | 1,191 | 1,140 | 242 |
| 0 at % | 5.03 | 66.48 | 0 | 0 | 0 |
| 5 at % | 6.98 | 93.06 | 545 | 934 | 146 |

$\rho$ is the density of the material;
$\rho_{rel}$ is the density relative to the starting material;
$H_c$ is the coercivity;
$B_r$ is the remanence; and
$(BH)_{max}$ is the maximum energy product.

It was evident from the BSE SEM images (not shown) that only a few light particles of the Nd-rich phase could be observed in the 0 at % $NdH_{2.7}$ sample, which was in agreement with the ICP-OES in Table 2. This confirms that separation was successfully performed but that there is still room for improvement in order to fully extract all of the remaining GBP particles bound to the $Nd_2Fe_{14}B_x$ surfaces. Table 4 shows that recycled re-sintered Nd—Fe—B magnets without any $NdH_{2.7}$ additions, exhibited a much lower density than the starting material (5.03 g cm$^{-3}$). This equates to a relative density of 66.48%, when compared with the results from the starting EOL Nd—Fe—B sintered magnet (Table 2). This is not surprising given the very small amounts GBP left in the magnet and the fact that this has been converted to $Nd(OH)_3$. Therefore there was insufficient liquid phase during sintering. It was not possible to measure the magnetic properties as the magnet broke apart after pulse magnetising.

5 at % $NdH_{2.7}$ was blended, into the hydrocyclone HD Nd—Fe—B powder (after 3 cycles), in an attempt to enhance liquid phase sintering and hence to obtain a fully dense recycled magnet. In this case, the density and relative density of the resultant re-sintered magnet increased to 6.98 g cm$^{-3}$ and 93.06%, respectively. The recycled magnet still showed significant porosity and it is clear that further $NdH_{2.7}$ is required to recover the full density for this sample.

The recycled re-sintered magnet made from hydrocyclone separated powder blended with 5 at % $NdH_{2.7}$ demonstrated an intrinsic coercivity, remanence and maximum energy product of 545 kA m$^{-1}$, 934 mT and 146 kJ m$^{-3}$ respectively. The decrease in coercivity is likely to be as a result of the porosity observed in the magnet, which will act as sites for reverse domains to nucleate.

It is particularly interesting to note that the remanence obtained in this magnet was only 18% lower than the starting material despite a density of only 6.98 g cm$^{-3}$. This implies that the matrix phase is intact after hydrocyclone separation which is confirmed by the XRD results shown in Table 3.

When further cyclone separations are applied to the HD powder and when >5 at % $NdH_{2.7}$ is added to the hydrocyclone separated powder then it should be possible to recover all of the remanence and coercivity.

The invention claimed is:

1. A method of processing NdFeB magnetic powder to form an NdFeB magnet, the method comprising:
   providing a source of sintered NdFeB magnet material comprising Nd-oxide;
   performing hydrogenation decrepitation on the sintered NdFeB magnet material to form hydrogenated NdFeB powder comprising Nd-oxide;
   feeding the hydrogenated NdFeB powder into an inlet of a cyclone separator;
   separating the powder into an overflow enriched in Nd-rich grain boundary phase and the Nd-oxide, and an underflow enriched in $Nd_xFe_yBH_z$ matrix phase particles;
   collecting the underflow;
   blending the underflow with fresh Nd particles to produce an Nd-enriched powder; and
   sintering and magnetising the Nd-enriched powder to form a NdFeB magnet.

2. The method of claim 1 wherein the underflow is fed into the inlet of the cyclone separator sufficient times until the underflow is at least 95 wt. % $Nd_xFe_yBH_z$ matrix phase particles.

3. The method of claim 1 wherein the Nd particles are elemental Nd, Nd-hydride or an alloy of Nd.

4. The method of claim 1 wherein the cyclone separator is a hydrocyclone separator and the hydrogenated NdFeB powder is formed into an aqueous slurry before being fed into the inlet of the separator.

5. The method of claim 4 wherein the collected underflow is dried.

6. The method of claim 1 further comprising feeding the underflow back into the inlet of the cyclone separator to further enrich the underflow in the $Nd_xFe_yBH_z$ matrix phase particles.

7. The method of claim 1 wherein the source of sintered NdFeB magnet is Hard Disk Drives (HDD).

8. The method of claim 1 wherein the hydrogenated NdFeB powder is demagnetized.

9. The method of claim 1 wherein the source of sintered NdFeB magnet comprises a matrix of $Nd_2Fe_{14}B$ matrix surrounding an Nd-rich grain boundary.

10. The method of claim 9 wherein when performing the hydrogenation decrepitation on the sintered NdFeB magnet source, $Nd_2Fe_{14}B_x$ matrix phase particles and $NdH_{2.7}$ grain boundary phase particles are formed, the $Nd_2Fe_{14}B_x$ matrix phase particles being larger than the $NdH_{2.7}$ grain boundary phase particles.

11. The method of claim 10 wherein the separating the hydrogenated NdFeB powder separates the matrix phase particles from the grain boundary phase particles.

12. The method of claim 11 wherein the grain boundary phase particles have a higher oxygen content than the matrix phase particles.

13. The method of claim 1 wherein the hydrogenated NdFeB powder comprises $NdH_{2.7}$, $Nd_2Fe_{14}BH_x$, and the Nd-oxide.

14. The method of claim 13 wherein the NdFeB powder comprises $Nd_2Fe_{14}BH_x$ matrix phase particles, $NdH_{2.7}$ grain boundary phase particles, and the Nd-oxide, wherein the $NdH_{2.7}$ grain boundary phase particles and the Nd-oxide are smaller than the $Nd_2Fe_{14}BH_x$ matrix phase particles.

15. The method of claim 14 wherein the $Nd_2Fe_{14}BH_x$ matrix phase particles are greater than 5 microns in size and the $NdH_{2.7}$ grain boundary phase particles, and the Nd-oxide are smaller than 1 micron in size.

16. The method of claim 1 wherein the Nd-rich grain boundary phase comprises oxygen-rich portions.

17. The method of claim 16 wherein the oxygen-rich portions are particles smaller than 1 micron.

18. The method of claim 1 wherein the oxygen-rich portions are removed using the cyclone separator and replaced with the fresh Nd particles to produce the Nd-enriched powder.

* * * * *